US 9,842,051 B1

(12) United States Patent
Schuttenberg et al.

(10) Patent No.: US 9,842,051 B1
(45) Date of Patent: Dec. 12, 2017

(54) MANAGING ALIASING IN A VIRTUALLY INDEXED PHYSICALLY TAGGED CACHE

(71) Applicant: Marvell International Ltd., Hamilton HM 12 (BM)

(72) Inventors: Kim Schuttenberg, Gilbert, AZ (US); Richard Bryant, Chandler, AZ (US); Sujat Jamil, Gilbert, AZ (US); R. Frank O'Bleness, Tempe, AZ (US)

(73) Assignee: Marvell International Ltd., Hamilton (BM)

( * ) Notice: Subject to any disclaimer, the term of this patent is extended or adjusted under 35 U.S.C. 154(b) by 85 days.

(21) Appl. No.: 15/074,764

(22) Filed: Mar. 18, 2016

Related U.S. Application Data

(60) Provisional application No. 62/138,024, filed on Mar. 25, 2015.

(51) Int. Cl.
*G06F 12/08* (2016.01)
*G06F 12/0831* (2016.01)

(52) U.S. Cl.
CPC .... *G06F 12/0833* (2013.01); *G06F 2212/621* (2013.01)

(58) Field of Classification Search
CPC .................................................. G06F 12/0833
USPC ........ 711/146, 128, 141, 144, 154, 156, 202
See application file for complete search history.

(56) References Cited

U.S. PATENT DOCUMENTS

| 5,119,290 | A | * | 6/1992 | Loo | ............ | G06F 12/1063 711/210 |
| 5,933,844 | A | * | 8/1999 | Young | ............ | G06F 12/1063 711/135 |
| 6,006,312 | A | * | 12/1999 | Kohn | ............ | G06F 12/1045 711/122 |
| 6,061,774 | A | * | 5/2000 | Witek | ............ | G06F 12/1063 711/202 |
| 7,594,079 | B2 | * | 9/2009 | Yu | ............ | G06F 12/0864 711/128 |
| 7,870,325 | B2 | * | 1/2011 | Joukan | ............ | G06F 12/1054 711/3 |
| 7,900,020 | B2 | * | 3/2011 | Williamson | ............ | G06F 12/0864 711/118 |
| 8,417,915 | B2 | * | 4/2013 | Gilday | ............ | G06F 12/0864 711/118 |
| 9,720,842 | B2 | * | 8/2017 | Dimitrov | ............ | G06F 12/0897 |
| 2007/0028051 | A1 | * | 2/2007 | Williamson | ............ | G06F 12/0864 711/128 |
| 2010/0011166 | A1 | * | 1/2010 | Yu | ............ | G06F 12/0864 711/128 |

* cited by examiner

*Primary Examiner* — Stephen Elmore

(57) ABSTRACT

A circuit includes a Virtually Indexed Physically Tagged (VIPT) cache and a cache coherency circuit. The VIPT cache includes a plurality of sets and performs a memory operation by selecting, using a Virtual Set Address (VSA), a first tag of a first set. The cache coherency circuit is to detect cache aliasing during memory operations of the VIPT cache when a second tag maps a physical address to a second set of the VIPT cache, the second set being different than the first set. A method of managing a VIPT cache includes performing, by the VIPT cache, a memory operation and determining, using a cache coherency protocol, that cache aliasing has occurred during the memory operation.

20 Claims, 4 Drawing Sheets

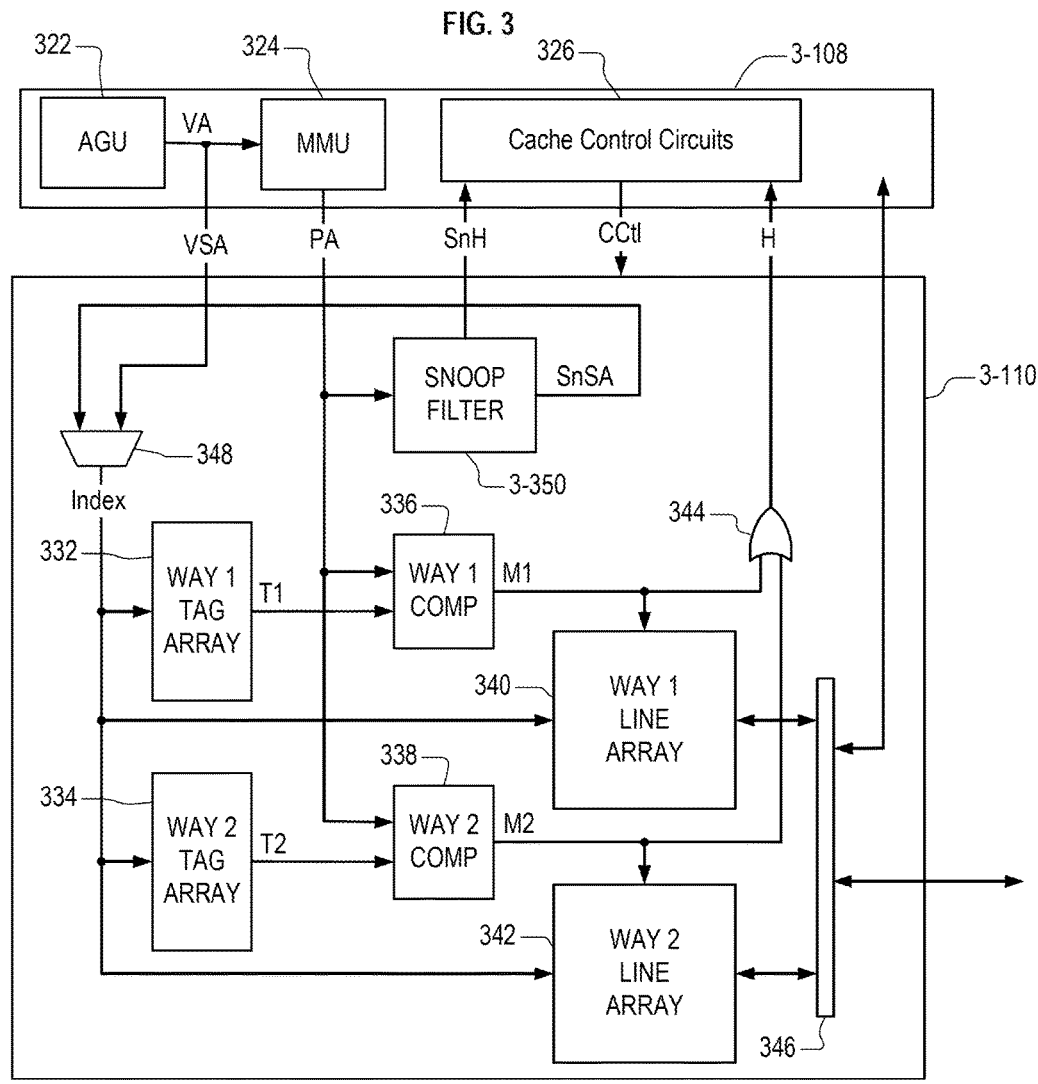
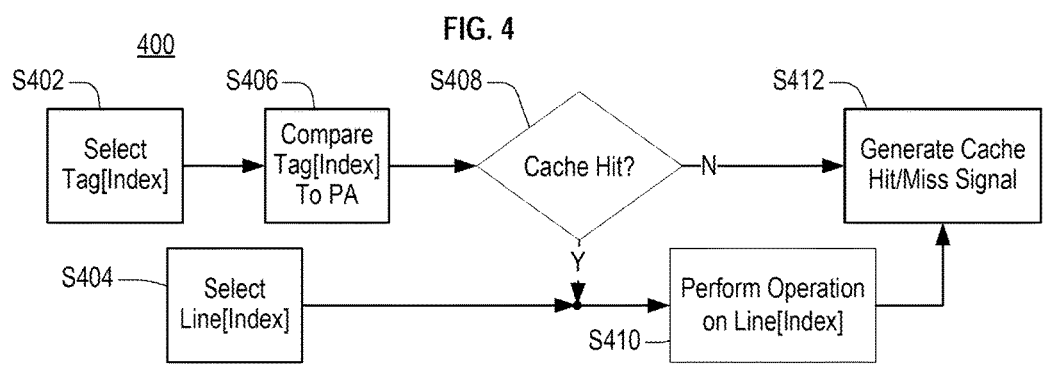

MANAGING ALIASING IN A VIRTUALLY INDEXED PHYSICALLY TAGGED CACHE

CROSS REFERENCE TO RELATED APPLICATION

This present disclosure claims the benefit of U.S. Provisional Application No. 62/138,024, filed on Mar. 25, 2015, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the description that follows, "byte" refers to an octet, that is, to 8 binary digits (bits). The term "kilobyte" and the abbreviation "KB" both refer to 1024 bytes.

In a computer processor, a cache memory circuit (hereinafter, a cache) may be used to store data corresponding to a location in a main memory. The cache is typically smaller, has lower latency, and has higher bandwidth than the main memory.

The cache may include a plurality of tags respectively associated with a plurality of memory elements that store data (hereinafter, cache lines). The cache compares an address of a memory operation with an address stored in a tag to determine whether the cache line associated with the tag corresponds to the location indicated by the address of the memory operation, that is, whether the location indicated by the address of the memory operation is cached.

A set-associative cache may only check one of a plurality of sets of the cache when determining whether a location is cached. The set-associative cache determines which set to check using bits of the address of the memory operation. For example, in a set-associative cache having 256-byte cache lines and 256 sets, the set to check may be determined using bits 15 through 8 of the address of the memory location (with bits 7 through 0 indicating particular bytes within the 256-byte cache lines). In this example, bits 15 to 8 correspond to the set address.

A set-associate cache may have a plurality of ways. The number of ways indicates the number of distinct locations in the cache that may correspond to any one memory location.

Caches may be used in processors having virtual memory architectures. In a virtual memory architecture, virtual addresses are generated by the processor and are then translated by a Memory Management Unit (MMU) into physical addresses. In a typical MMU, memory addresses are translated in pages. For example, in an MMU using 4 KB pages, each 4 KB page in the virtual memory space may be mapped to a 4 KB page in the physical address space. A location at an offset within the virtual memory page will be located at the same offset within the corresponding physical address page.

To reduce a latency of load operations, the cache may begin a process of retrieving data before the physical address of the data is fully known. In particular, a virtually indexed, physically tagged (VIPT) cache may begin the process of retrieving data before the MMU completes an address translation between a virtual address and a physical address.

The VIPT cache is a set-associative cache that uses a plurality of bits of the virtual address as the set address, that is, the VIPT cache uses a virtual set address (VSA) to index the cache. Once the VSA has been determined, the VIPT cache compares a plurality of bits of the physical address against the tags in the set corresponding to the VSA to determine whether the VIPT cache includes a cache line corresponding to the memory location specified by the physical address.

When the VIPT cache includes a plurality of ways, in each way, a tag corresponding to the VSA is checked for the corresponding cache line.

When the VSA includes only address bits that are invariant in the address translation (hereinafter, invariant bits), the set address will always identify the correct location because any given value of the physical address will always be associated with a same value for the VSA. For example, when the MMU uses 4 KB pages, bits 11 to 0 of the virtual address indicate the offset within the page and are therefore not altered by the address translation.

Indexing the VIPT cache using only invariant bits can reduce flexibility in the design of the cache. When the VIPT cache is indexed using the invariant bits, the number of sets may be limited by the number of invariant bits, and increasing the size of the cache may require adding more ways to the cache instead of increasing the number of sets.

When the set address includes bits other than invariant bits, cache aliasing may occur in the VIPT cache. Cache aliasing may occur when both (i) a first virtual address and a second virtual address are each translated to a same physical address, and (ii) a first VSA generated using the first virtual address has a different value than a second VSA generated using of the second virtual address.

For example, the first virtual address may produce a first VSA of 0, and the second virtual address may produce a second VSA of 128. Depending on whether and which virtual address caused a cache line to be allocated to the physical address, the cache line corresponding to the physical address may be a first cache line within set 0 of the VIPT cache, a second cache line within set 128 of the VIPT cache, both the first cache line and the second cache line, or not in the VIPT cache at all.

Therefore, if the VIPT cache checks only one of set 0 and set 128 for the corresponding cache line, and the cache line is not in the checked set but is in another set because of cache aliasing, the VIPT cache may erroneously determine that the corresponding cache line is not in the VIPT cache. This erroneous determination can produce one or more of data errors, performance degradation, and increased power consumption.

Therefore, when cache aliasing occurs, the VIPT cache should quickly and efficiently (i) detect whether a cache line corresponding to the physical memory address is present in the VIPT cache, and (ii) identify the corresponding cache line.

SUMMARY

In an embodiment, a circuit comprises a Virtually Indexed Physically Tagged (VIPT) cache and a cache coherency circuit. The VIPT cache includes a plurality of sets. The VIPT cache performs a memory operation by (i) selecting, using a Virtual Set Address (VSA), a first tag of a first set of the VIPT cache, and (ii) determining whether the first tag maps a physical address to the first set by comparing a plurality of bits of the first tag to a plurality of bits of the physical address. The cache coherency circuit detects cache aliasing during the performance of the memory operation by the VIPT cache, wherein cache aliasing is detected when a second tag maps the physical address to a second set of the VIPT cache, the second set being different from the first set.

In an embodiment, a method for managing a Virtually Indexed Physically Tagged (VIPT) cache comprises performing, by the VIPT cache, a memory operation and determining, using a cache coherency protocol, that cache aliasing has occurred during the memory operation. Performing the memory operation includes (i) selecting, by the VIPT cache using a Virtual Set Address (VSA), a first tag of a first set of the VIPT cache, and (ii) determining whether the first tag maps a Physical Address (PA) to the first set by comparing a plurality of bits of the first tag to a plurality of bits of the physical address. The method determines that cache aliasing has occurred during the memory operation when a second tag maps the PA to a second set, the second set being different from the first set.

BRIEF DESCRIPTION OF THE DRAWINGS

FIG. 3 illustrates portions of a processor core and a cache according to an embodiment.

FIG. 4 illustrates a process for determining a cache hit according to an embodiment.

DETAILED DESCRIPTION

Figure 1:
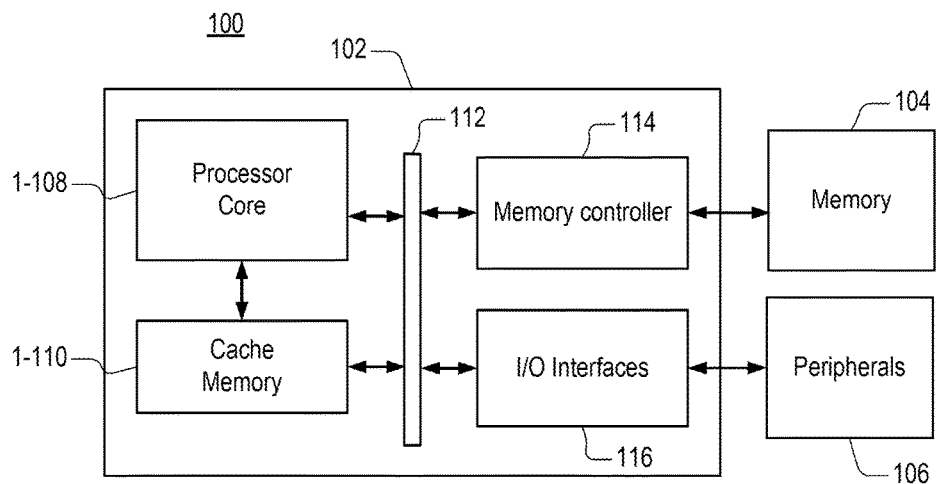
FIG. 1 illustrates an electronic system according to an embodiment of the present disclosure.

FIG. 1 illustrates an electronic system 100 according to an embodiment of the present disclosure. The electronic system 100 includes a computer processor 102, an electronic storage circuit (hereinafter, a memory) 104, and one or more peripherals 106. In an embodiment, the electronic system 100 is a System-on-a-Chip (SoC).

The computer processor 102 includes a processor core 1-108, a cache memory (hereinafter, a cache) 1-110, a bus 112, a memory controller 114, and one or more Input/Output (I/O) interfaces 116. In an embodiment, the computer processor 102 is a System-on-a-Chip (SoC).

A memory controller 114 of the computer processor 102 is coupled to the memory 104 and operates to store information in the memory 104 (that is, to write to the memory 104) and to retrieve information stored in the memory 104 (that is, to read from the memory 104). The information may include data, computer programming instructions, or both.

The memory 104 includes a non-transient computer readable medium, including one or more of a Read-Only Memory (ROM), a volatile Random Access Memory (RAM), and a non-volatile memory. The ROM may include on or more a Programmable ROM (PROM), an Erasable Programmable ROM (EPROM), and the like. The RAM may include one or more of a Static RAM (SRAM), a Dynamic RAM (DRAM), and the like. The non-volatile memory may include one or more of an Electrically Erasable Programmable ROM (EEPROM), a Flash memory, a phase-change memory, and the like.

The memory 104 may also include one more outer-level caches. For example, when the cache 1-110 is a first level cache, the memory 104 may include one or more of a second level cache, a third level cache, and so on.

The I/O interfaces 116 may include one or more of a serial digital interface, a parallel digital interface, an analog interface, a network interface, and the like. Each of the I/O interfaces 116 may be an input interface, and output interface, or a bidirectional interface. The I/O interfaces 116 may also include one or bus interfaces, such as a Peripheral Component Interconnect (PCI) bus interface, a PCI eXtended (PCI-X) bus interface, an Inter-Integrated Circuit (I2C) bus interface, and the like.

The I/O interfaces 116 provide communication, control, or both for the peripherals 106. The peripherals 106 may include mass storage devices (e.g., one or more of an optical disc drive, a hard disc drive, a solid state disc, and the like), network interfaces (e.g. one or more of an Ethernet® adapter, a Wireless Local Area Network (WLAN) adapter, a Personal Area Network (PAN) adapter, and the like), a display adapter, a camera, a sensor, an actuator, and the like. The I/O interfaces 116 may include Direct Memory Access (DMA) devices.

The bus 112 provides communications between the processor core 1-108, the memory controller 114, and the I/O interfaces 116. In the embodiment shown in FIG. 1, the bus 112 also provides communications between the cache 1-110 and the memory controller 114. In another embodiment, the cache 1-110 may be coupled to the memory controller 114 through a dedicated point-to-point connection.

The cache 1-110 provides information corresponding to memory locations in the memory 104 to the processor core 1-108. The cache 1-110 provides the information with a lower latency, a higher bandwidth, or both than the memory 104 is capable of.

Although the cache 1-110 as described herein is a first-level cache, embodiments are not limited thereto. In an embodiment, the cache 1-110 may be any of a second-level cache, a third-level cache, and so on.

The processor 1-108 performs functions of the electronic system 100 by executing computer programming instructions retrieved from a non-transient computer-readable media, such as one or more of the cache 1-110 and the memory 104. The processor 1-108 may read, write, and manipulate data stored in the one or more of the cache 1-110, the memory 104, and the I/O interfaces 116.

Although the processor core 1-108 is described herein as a processor, embodiments are not limited thereto. In an embodiment, the processor core 1-108 may be a programmable Graphics Processing Unit (GPU) or other type of semiconductor circuit that executes instructions, manipulates data, or both, where the instructions, data, or both are stored in the memory 104, the cache memory 1-110, or both.

Figure 2:
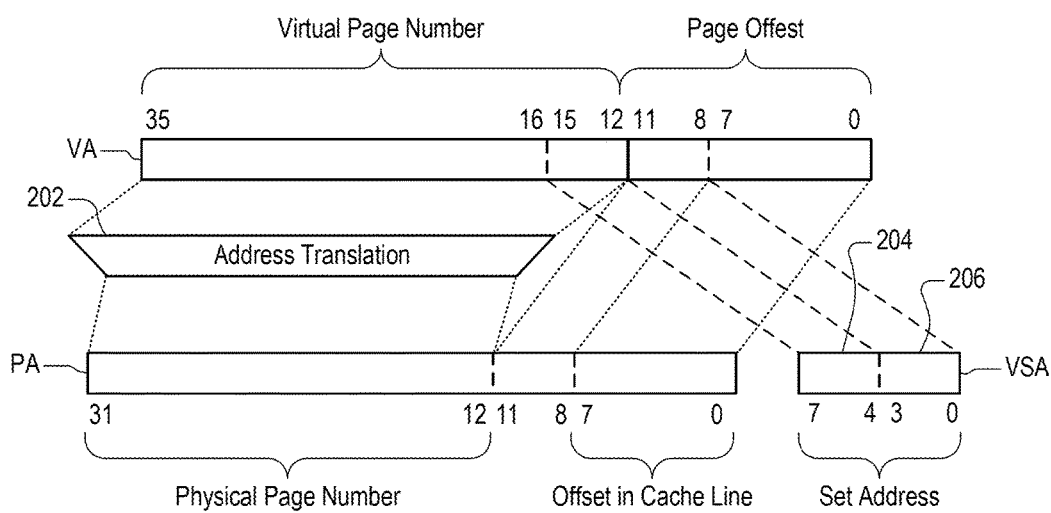
FIG. 2 illustrates a virtual memory address architecture according to an embodiment.

FIG. 2 illustrates a virtual memory address architecture according to an embodiment. The virtual memory address architecture translates a 36-bit virtual address VA into a 32-bit physical address PA. Also illustrated is a Virtual Set Address VSA according to the VA.

In the example of FIG. 2, the 24 most significant bits (MSBs) (bits 35 to 12) correspond to a virtual page number. The 12 least significant bits (LSBs) (bits 11 to 0) of the VA correspond to a page offset, indicating an offset within a page of memory.

The 12 least significant bits (LSBs) (bits 11 to 0) of the PA also correspond to a page offset. The page offset of the VA is identical to the page offset of the PA, that is, the bits corresponding to the page offset are invariant bits in the memory translation.

The virtual page number of the VA is translated, using an address translation process 202, to a physical page number. The physical page number corresponds to the 20 MSBs (bits 31 to 12) of the PA.

The example of FIG. 2 also illustrates aspects of an operation of a Virtually-Indexed, Physically Tagged (VIPT) cache. In the example of FIG. 2, the VIPT cache includes 256 byte cache lines. Therefore, bits 7 to 0 of the page offset correspond to an offset within the cache lines of the VIPT cache.

In the example of FIG. 2, the VIPT cache includes 256 sets. Accordingly, bits 15 to 8 of the VA are used as the Virtual Set Address VSA.

Bits 3 to 0 of the VSA correspond to bits 11 to 8 of the VA, which are invariant bits within the page offset. Bits 7 to 4 of the VSA correspond to bits 15 to 12 of the VA, which are not invariant bits, and as a result cache aliasing may occur in the VIPT cache.

Embodiments of the present disclosure use cache-coherency semantics to detect cache aliasing and to manage the cache aliasing when the cache aliasing occurs. Embodiments may include cache coherency circuits and cache coherency processes that maintain coherency for each set in the cache that a cached memory location may be present in, that is, for each of the candidate sets corresponding to the physical address of the cached memory location.

FIG. 3 illustrates portions of a processor core 3-108 and a VIPT cache 3-110 according to an embodiment. The processor core 3-108 and the cache 3-110 may respectively correspond to the processor core 1-108 and the cache 1-110 of FIG. 1.

The processor core 3-108 includes an Address Generation Unit (AGU) 322, a Memory Management Unit (MMU) 324, and cache control circuits 326. A person of ordinary skill in the art would understand that the processor core 3-108 may include one or more other circuits such as arithmetic circuits, logic circuits, control circuits, clock circuits, and the like, which are omitted for the sake of brevity.

The AGU 322 generates Virtual Addresses (VAs). In an embodiment, the AGU 322 includes one or more of an addition circuit, a shifting circuit, a multiplying circuit, and the like for calculating the virtual addresses according to computer programming instructions executed by the processor core 3-108.

A plurality of bits of each of the VAs are used as the respective Virtual Set Addresses (VSAs). For example, in an embodiment wherein the cache 3-110 is configured with cache lines having 256 bytes (so that bytes within the cache line are addressed using bits 7 to 0 of an address, where bit 0 is the least significant bit) and configured with 256 sets (therefore requiring an 8 bit VSA), bits 15 to 8 of a VA may be selected as the VSA.

The MMU 324 translates each of the VAs into a corresponding Physical Address (PA). The MMU 324 may include one or more of a Translation Look-aside Buffer (TLB), a finite state machine for processing a page table, a memory for storing page table entries, and the like. The MMU 324 may translate a plurality of VAs each having different respective virtual page numbers into a plurality of PAs each having a same physical page number.

The cache control circuit 326, using cache control signals CCtl, controls the operation of the cache 3-110 according to one or more of computer programming instructions executed by the processor core 3-108, a hit signal H from the cache 3-110, and a Snoop Hit signal SnH from the cache 3-110. The cache control signals CCtl may include one or more indications of a memory write operation of the processor core, a memory read operation of the processor core, a cacheability of a memory operation, and the like.

Although FIG. 3 shows the cache control circuit 326 included in the processor core 3-108, embodiments are not limited thereto. For example, in an embodiment, all or part of the cache control circuit 326 may be included in the cache 3-110.

The illustrative cache 3-110 shown in FIG. 3 is a two-way VIPT cache. The first way of the cache 3-110 includes a first tag array 332, a first comparator 336, and a first line array 340. The second way of the cache 3-110 includes a second tag array 334, a second comparator 338, and a second line array 342.

The cache 3-110 further includes a snoop filter 3-350, a multiplexer 348, an or gate 344, and a data bus 346. A person of ordinary skill in the art would understand that the cache 3-110 may include one or more other circuits such as logic circuits, control circuits, clock circuits, and the like, which are omitted for the sake of brevity.

Although FIG. 3 shows the snoop filter 3-350 and the multiplexer 348 included in the cache 3-110, embodiments are not limited thereto. For example, in an embodiment, one or both of the snoop filter 3-350 and the multiplexer 348 may be included in the processor core 3-108.

The first tag array 332 includes a first plurality of tag entries, each tag entry including an address value and a validity indicator. The number of tag entries in the first plurality of tag entries corresponds to the number of sets in the cache 3-110.

The first tag array 332 receives an index signal from the multiplexer 348. The first tag array 332 generates, using the index signal, a first selected tag entry T1 of the first plurality of tag entries.

The first comparator 336 receives the first selected tag entry T1 and receives the physical address PA from the processor core 3-108. The first comparator 336 generates a first match signal M1 according to the first selected tag entry and the physical address PA.

The first line array 340 includes a first plurality of cache lines, each cache line including a plurality of bytes of information. For example, in the example discussed with relation to FIG. 2, each cache line included 256 bytes of information. The number of cache lines in the first plurality of cache lines corresponds to the number of sets in the cache 3-110.

The first line array 340 receives the index signal from the multiplexer 348. The first line array 340 receives the first match signal M1 from the first comparator 336.

The second tag array 334, second comparator 338, and second line array 342 of the second way are configured and coupled in the same manner as respectively described for the first tag array 332, the first comparator 336, and the first line array 340 of the first way. The second selected tag entry T2 and the second match signal M2 of the second way respectively correspond to the first selected tag entry T1 and the first match signal M1 of the first way.

The snoop filter 3-350 includes a plurality of snoop filter entries. Each snoop filter entry of the plurality of snoop filter entries includes a validity indication, a tag address, and coherency information for each potential set that a physical address corresponding to the tag address may be mapped into in the cache 3-110, that is, for each candidate set of the physical address.

The snoop filter 3-350 receives the physical address PA. The snoop filter generates, using the physical address PA and the plurality of snoop filter entries, a snoop set address signal SnSA and a snoop hit signal SnH.

The multiplexer 3-348 receives the virtual set address signal VSA from the processor core 3-108 and receives the snoop set address signal SnSA from the snoop filter 3-350. The multiplexer generates the index signal according to the virtual set address signal VSA, the snoop set address signal SnSA, and the cache control signals CCtl.

In an embodiment, the multiplexer 3-348 is controlled to select the VSA as the index signal when the cache 3-110 is determining whether a set corresponding to the VSA includes a cache line corresponding to the PA, and is controlled to select the SnSA as the index signal when the snoop filter 3-350 has determined that cache aliasing has occurred. That is, the multiplexer 3-348 is controlled to select the SnSA as the index signal when the snoop filter 3-350 has determined that a set that does not correspond to the VSA includes a cache line corresponding to the PA.

The or gate 344 generates a hit signal H according to the first and second match signals M1 and M2. When either of the first match signal M1 or the second match signal M2 indicates a cache hit, the or gate 344 generates a hit signal H indicating that a cache hit has been detected.

The bus 346 operates to transfer information between any two of the first line array 344, second line array 342, the processor core 3-108, and a circuit external to the processor core 3-108 and the cache 3-110, such as the memory controller 114 or the I/O interfaces 116 of FIG. 1.

Although the illustrative cache 3-110 shown in FIG. 3 is a two-way VIPT cache, embodiments are not limited thereto. In an embodiment, the cache 3-110 is a direct-mapped VIPT cache. In other embodiments, the cache 3-110 has 3 or more ways.

FIG. 4 illustrates a process 400 for determining a cache hit according to an embodiment. The process 400 may be performed for each of the first and second ways of the cache 3-110 according to an embodiment.

The process 400 will be described with respect to the first way of the cache 3-110. A person of ordinary skill in the art will understand that a substantially identical process 400' for the second way of the cache 3-110 may be performed in parallel with the performing of the process 400 for the first way.

At S402, the first tag array 332 selects the first selected tag entry T1 according to the value of the index signal. For example, when the index signal has a value of 0, a first tag entry of the first plurality of tag entries is selected, when the index signal has a value of 1, a second tag entry of the first plurality of tag entries is selected, and so on.

At S404, the first line array 340 selects, using the index signal, a first selected line of the first plurality of cache lines according to the value of the index signal. For example, when the index signal has a value of 0, a first cache line of the first plurality of cache lines is selected, when the index signal has a value of 1, the second cache line of the first plurality of cache lines is selected, and so on.

At S406, the first comparator 336 generates, using the first selected tag entry T1 and the physical address PA, the first match signal M1.

When the first selected tag entry T1 includes a validity indication signifying that the address value of the first selected tag entry T1 is not valid, or when and the address value of the first selected tag entry T1 is not equal to a corresponding portion of the physical address PA, the first comparator 336 generates the first match signal M1 having a value indicating that the physical address PA does not match the first selected tag entry T1, that is, that a cache hit has not occurred in the first way.

When the first selected tag entry T1 includes a validity indication signifying that the address value of the first selected tag entry T1 is valid, and the address value of the first selected tag entry T1 is equal to the corresponding portion of the physical address PA, the first comparator 336 generates the first match signal M1 having a value indicating that the physical address PA matches the first selected tag entry T1, that is, that a cache hit has occurred in the first way.

At S408, the process 400 proceeds to S410 when the first match signal M1 indicates that a cache hit has occurred. Otherwise, at S408 the process 400 proceeds to S412 when the first match signal M1 indicates that a cache hit has not occurred.

At S410, the first line array 340 performs the operation associated with the physical address PA on the first selected line. For example, when the physical address PA is an address of a read operation, the first line array 340 reads information from the first selected line and provides the read information to the bus 346, and when the physical address PA is an address of a write operation, the first line array 340 receives information from the bus 346 and stores the received information into the first selected line. The process 400 then proceeds to S412.

At S412, the or gate 344 generates the cache hit signal H according to the first match signal M1 generated according to the process 400 and the second match signal M2 generated according to the correspond process 400' performed for the second way. If a cache hit occurred in either of the first way or the second way, the or gate 344 generates the cache hit signal H indicating a cache hit. If a cache hit occurred in neither the first way or the second way, the or gate 344 generates the cache hit signal H indicating there was not a cache hit, that is, that a cache miss occurred.

Figure 5:
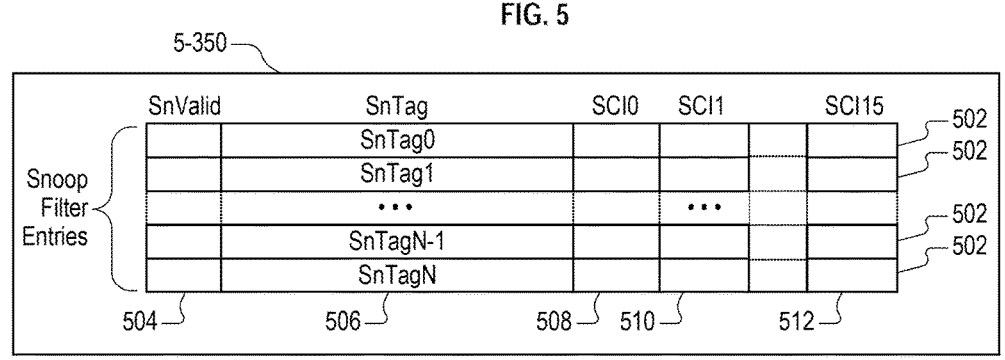
FIG. 5 illustrates information stored in a snoop filter according to an embodiment.

FIG. 5 illustrates information stored in an illustrative snoop filter 5-350 according to an embodiment. The snoop filter 5-350 may be the snoop filter 3-350 of the two-way VIPT cache 3-110 shown in FIG. 3.

The description of the snoop filter 5-350 will be presented according to the virtual memory address architecture of FIG. 2 and the VIPT cache of FIG. 3, but the embodiments are not limited thereto. Embodiments may include snoop filters configured for use with a VIPT cache including any number of ways and for any virtual memory address architecture that results in one or more non-invariant bits in a VSA of the VIPT cache.

The snoop filter 5-350 includes a plurality of snoop filter entries 502. Each snoop filter entry 502 includes snoop entry validity information (SnValid) 504 and an address tag (SnTag) 506. The SnValid 504 indicates whether the SnTag 506 is valid. The SnTag 506 includes a portion of a physical address.

In an embodiment, the SnTag 506 includes a physical page number of the physical address.

Each snoop filter entry 502 further includes coherency information for each set address that the PA may map into, that is, for each candidate sets for the PA. For example, in the snoop filter 5-350 of the VIPT cache 3-110, wherein each PA address has 16 candidate sets (because the VSA includes 4 non-invariant bits), each snoop filter entry 502 includes first set coherency information (SCI0) 508, second set coherency information (SCI1) 510, and so on, up to sixteenth set coherency information (SCI15) 512.

The SCI0 508 may correspond to a candidate set having a set address equal to concatenation of zero to the invariant bits of the VSA (which are the same as in the PA and the VA), the SCI1 510 may correspond to a set having a set address equal to concatenation of one to the invariant bits of the VA, and so on.

For example, in the memory mapping of FIG. 2 the VSA includes four invariant less-significant bits 206 (bits 3 to 0 of the VSA, corresponding to bit 11 to 8 of the VA and PA) which will always be the same for a given value of the PA. The VSA also includes 4 non-invariant bits 204, which depending on the address translation of the PA can have any value from 0 to 15 for the given value of the PA. As a result the given value of the PA can be mapped in the VIPT cache to any of 16 sets, corresponding to set addresses equal to (16*a)+b, where a is the value of the non-invariant bit 204 and b is the value of the invariant bits 206.

As a result, in the example of FIG. 2, a PA have a hexadecimal value of, for example, xxxxx xxx xxxx xAxx, where "x" indicates a "don't care," may generate a VSA equal to any one of hexadecimal 0A, 1A, 2A, 3A, 4A, 5A, 6A, 7A, 8A, 9A, AA, BA, CA, DA, EA, and FA, which comprise the candidate sets for PAs corresponding to the hexadecimal values xxxx xxxx xxxx xAxx.

Each snoop filter entry 502 respectively indicates, when the SnValid 504 indicates that the respective SnTag 506 is valid, the coherency state of each candidate set for the PA corresponding to the SnTag 506. The memory location corresponding to the valid SnTag 506 is cached in a candidate set of the cache 3-110 when the corresponding coherency state of the candidate set is not the Invalid state 1.

In an embodiment, the snoop filter 5-350 may be an inclusive snoop filter, that is, when a memory location is cached in the cache 3-110, a snoop filter entry 502 including a valid SnTag 506 corresponding to the memory location will be present in the snoop filter 5-350. In an embodiment, the number of snoop filter entries 502 in the snoop filter 5-350 may be equal to the total number of cache lines in the cache 3-110.

In an embodiment, the plurality of snoop filter entries 502 may be included in a physically tagged fully associative cache within the snoop filter 5-350, wherein the respective SnTags 506 correspond to tags of the fully-associative cache.

In an embodiment, the plurality of snoop filter entries 502 may be included in a physically indexed physically tagged set-associative cache within the snoop filter 5-350, wherein the respective SnTags 506 correspond to tags of the set-associative cache.

Figure 6:
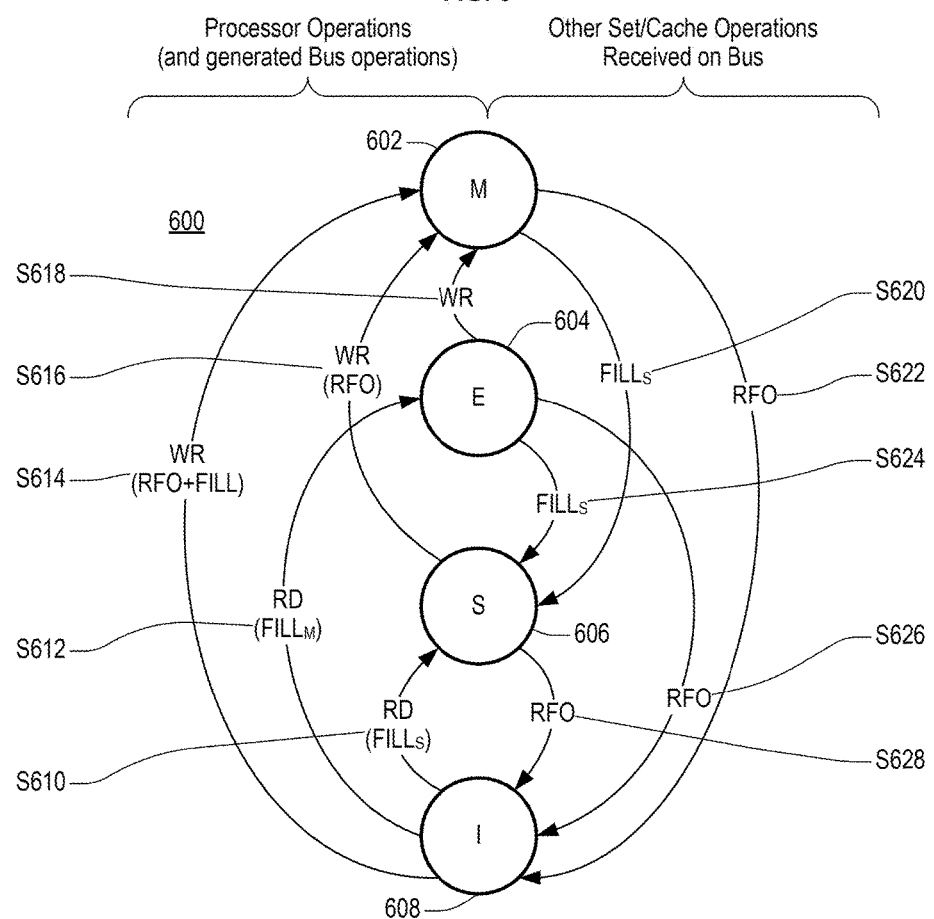
FIG. 6 illustrates a process for managing set coherency information according to an embodiment.

FIG. 6 is a state transition diagram that illustrates a process 600 of managing set coherency information of a snoop filter entry according to an embodiment. The snoop filter entry may be a snoop filter entry 502 of the snoop filter 5-350 of FIG. 5.

The process 600 will be described with respect to the first set coherency information (SCI0) of the snoop filter entry 502, but a person of ordinary skill in the art would understand that other respective processes would operate substantially identically for the other set coherency information of the snoop filter entry 502. Each process corresponding to each respective set coherency information of the snoop filter entry 502 may be performed in parallel with some or all of the other such processes.

The process illustrated in FIG. 6 corresponds to a Modified-Exclusive-Shared-Invalid (MESI) coherence protocol, but embodiments are not limited thereto. In an embodiment, any one of a Modified-Shared-Invalid (MSI) coherence protocol, a Modified-Owned-Shared-Invalid (MOSI) coherence protocol, a Modified-Owned-Exclusive-Shared-Invalid (MOESI) coherence protocol, and the like may be used to manage the set coherency information of the snoop filter 5-350.

The snoop filter 5-350 treats each of the possible sets where a memory location can be stored (that is, each candidate set for the PA of the memory location) the same way a multi-processor system treats each separate cache, and coherency is maintained between the sets of the candidate sets in an analogous way.

In an embodiment, the snoop filter 5-350 is used to manage cache coherency between the sets of the cache 3-110 associated with the snoop filter 3-350 and is used to manage cache coherency between the cache 3-110 and one or more other caches.

FIG. 6 illustrates a process 600 for managing the SCI0 508 when an SnValid 504 of a snoop filter entry 502 indicates that an SnTag 506 of the snoop filter entry 502 is valid and the SnTag 506 matches a memory address of a memory location corresponding to a current memory operation. Events that do not change a value of the SCI0 508 are not shown.

The SCI0 508 of the snoop filter entry 502 having the Invalid (1) state 608 (that is, when the value of the SCI0 508 corresponds to the I state 608) indicates that the memory location corresponding to the SnTag 506 is not cached in the candidate set corresponding to the SCI0 508 (that is, the first of the candidate sets).

The SCI0 508 having the Shared (S) state S606 indicates that the memory locations is cached in both (i) the candidate set corresponding to the SCI0 508 and (ii) some other cache line in either another candidate set of the cache 3-110 or another cache.

The SCI0 508 having the Exclusive (E) state S604 indicates that the location in the memory that corresponds to the SnTag 506 is cached only in a cache line in the candidate set corresponding to the SCI0 508 and that the information in the cache line is identical to the information in the location in the memory.

The SCI0 508 having the Modified (M) state S602 indicates that the location in the memory that corresponds to the SnTag 506 is cached only in a cache line in the candidate set corresponding to the SCI0 508 and that the information in the cache line is different from (that is, modified with respect to) and a more recent version of the information in the location in the memory.

S610 to S618 correspond to actions taken by the process 600 in response to operations of the processor core 3-108. S620 to S628 correspond to actions taken by the process 600 in response to indications received from other sets of the cache 3-110 (and in some embodiments from other caches).

At S610, the process 600 sets the SCI0 508 to the S state 606 when the SCI0 508 has the I state 608, a read operation (RD) misses the cache 3-110, and a cache line in the candidate set corresponding to the SCI0 508 is filled from another candidate set of the cache 3-110 (or in some embodiments, from another cache) into the set corresponding to SCI0 508 (FILLs). The miss may have occurred because of cache aliasing, even when the location was cached in another cache line of the cache 3-110.

At S612, the process 600 sets the SCI0 508 to the E state 604 when the SCI0 508 has the I state 608, a read operation (RD) misses the cache 3-110, and the line is filled from the memory (FILL$_M$).

At S614, the process 600 sets the SCI0 508 to the M state 602 when the SCI0 508 has the I state 608, a write operation (WR) misses the cache 3-110, and the line is filled from any of (i) another candidate set of the cache 3-110, (ii) another cache, and (iii) the memory (FILL). A Read For Ownership (RFO) indication is generated to indicate to other candidate sets of the cache 3-110 (and in some embodiments to other caches) that the set corresponding to SCI0 508 in the cache 3-110 will have the location cached in a modified state.

At S616, the process 600 sets the SCI0 508 to the M state 602 when the SCI0 508 has the S state 606 and a write operation (WR) hits the set corresponding to SCI0 508 in the cache 3-110. The RFO indication is generated to indicate to other candidate sets of the cache 3-110 (and in some embodiments to other caches) that the set corresponding to SCI0 508 in the cache 3-110 will have the location cached in a modified state At S618, the process 600 sets the SCI0 508 to the M state 602 when the SCI0 508 has the E state 604 and a write operation (WR) hits the set corresponding to SCI0 508 in the cache 3-110. Because the E state 604 indicates that no other set of cache 3-110 (and in some embodiments no other caches) have information corresponding the cached location, the RFO operation is not generated.

At S620, the process 600 sets the SCI0 508 to the S state 606 when the SCI0 508 has the M state 602 and a fill from set operation $FILL_S$ generated by another candidate set of the cache 3-110 (or in some embodiments from another cache) reads out information in the cache line of the cache 3-110 that corresponds to the address tag 506 and the first way set address (SISA). The information may also be copied back to the memory.

At S622, the process 600 sets the SCI0 508 to the I state 608 when the SCI0 508 has the M state 602 and a Read For Ownership (RFO) operation corresponding to the address tag 506 is generated by another candidate set of the cache 3-110 (or in some embodiments by another cache).

At S624, the process 600 sets the SCI0 508 to the S state 606 when the SCI0 508 has the E state 604 and a fill from set operation $FILL_S$ generated by another candidate set of cache 3-110 (or in some embodiments from another cache) reads out information in the cache line of the cache 3-110 that corresponds to the address tag 506 and the set corresponding to SCI0 508.

At S626, the process 600 sets the SCI0 508 to the I state 608 when the SCI0 508 has the E state 604 and a Read For Ownership (RFO) operation corresponding to the address tag 506 is generated by another candidate set of the cache 3-110 (or in some embodiments by another cache).

At S628, the process 600 sets the SCI0 508 to the I state 608 when the SCI0 508 has the S state 606 and a Read For Ownership (RFO) operation corresponding to the address tag 506 is generated by another candidate set of the cache 3-110 (or in some embodiments by another cache).

The possible state transitions are illustrative, and embodiments are not limited thereto. In an embodiment using a different protocol (such as MSI, MOESI, and so on) or that uses a variation of the MESI protocol shown in FIG. 6, state transitions associated with cache-to-cache coherency management that are dictated by the coherency protocols map directly onto state transitions associated with set-to-set coherency management within the cache 3-110.

Figure 7:
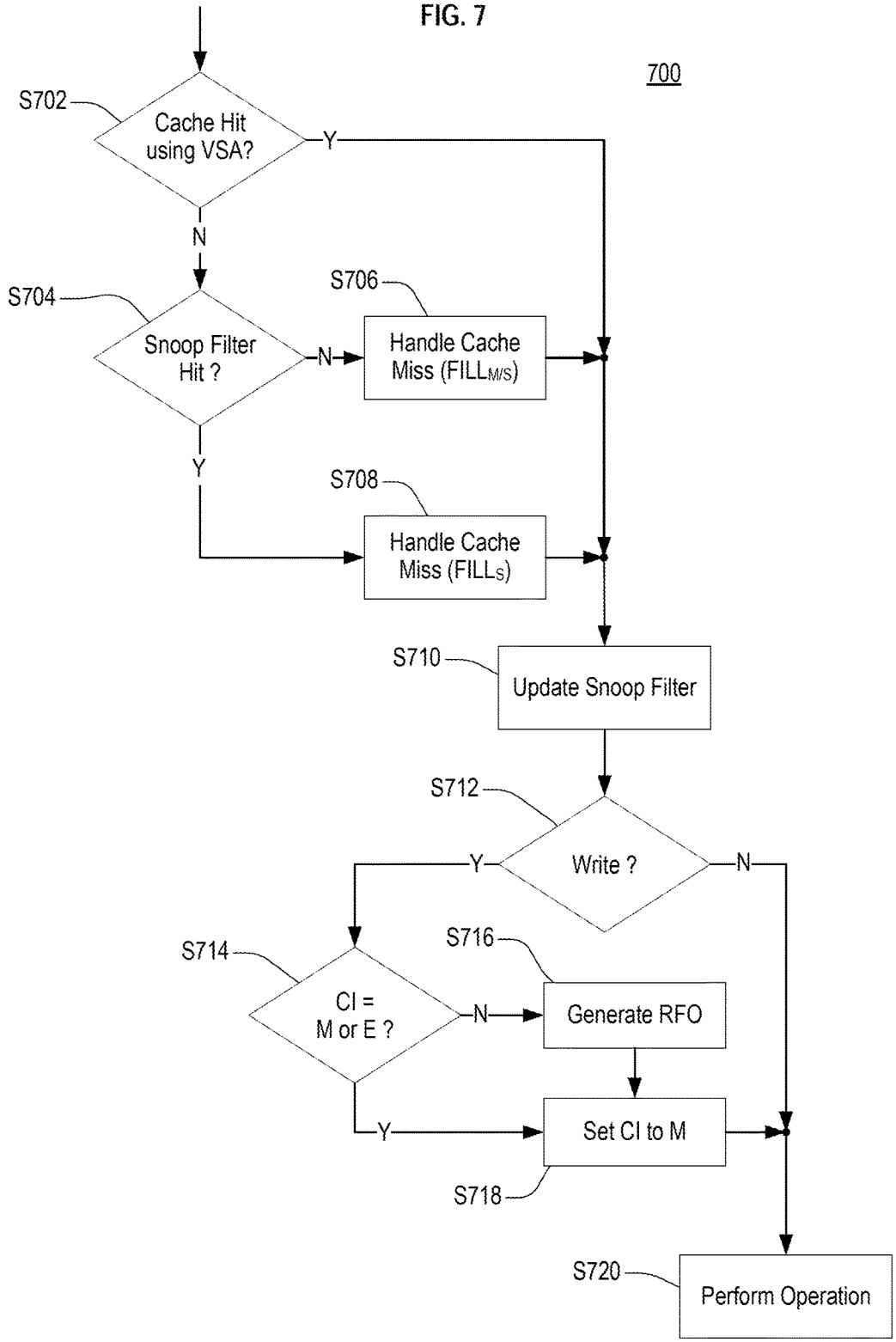
FIG. 7 illustrates a process for performing a cached memory operation according to an embodiment.

FIG. 7 illustrates a process 700 of performing a cached memory operation in a VIPT cache according to an embodiment. The cached memory operation may be a read operation to a cacheable memory location (hereinafter, memory location) or a write operation to the memory location.

At S702, an indication of whether a cache line corresponding to the memory location is present in the VIPT cache (that is, a cache hit signal) is generated according to a Virtual Set Address (VSA) and a Physical Address (PA) of the cached memory operation. The VIPT cache uses the VSA to select a plurality of tags, and then compares each tag of the plurality of tags to the PA to determine whether a cache hit has occurred. In an embodiment, the cache hit indication may be generated according the process 400 of FIG. 4.

When the cache bit signal indicates that the cache line is present, the process 700 proceeds to S710. When the cache hit signal indicates that the cache line is not present, the process 700 proceeds to S704.

At S704, a snoop filter, such as the snoop filter 5-350 of FIG. 5, determines whether a cache line corresponding to the memory location is present in the VIPT cache, using the PA. When cache aliasing has occurred, the snoop filter may determine that the corresponding cache line is present even when a cache hit was not determined at S710.

The snoop filter compares the PA to one or more of a plurality of snoop filter entries. When a snoop filter entry has a snoop filter tag that is valid, the snoop filter tag matches the PA, and coherency state information associated with a candidate set of the PA is in a state other than an Invalid state I, the snoop filter indicates a snoop filter hit.

When the snoop filter indicates that there is not a snoop filter hit, the process 700 proceeds to S706.

When the snoop filter indicates a snoop filter hit, the snoop filter generates a snoop filter set address (SnSA) according to which of the candidate sets had the set coherency information in the state other than the Invalid state I. The process 700 then proceeds to S708.

At S706, the VIPT cache performs a fill operation to retrieve the information corresponding to the memory location. The fill operation will be a $FILL_M$ operation when the information is retrieved the memory, and will be a $FILL_S$ operation when the information is retrieved from a cache other than the VIPT cache. The process 700 then proceeds to S710.

At S708, the VIPT cache performs a fill operation to retrieve the information from the set indicated by the snoop filter set address SnSA. The fill operation will be a $FILL_S$ operation. The process 700 then proceeds to S710.

At S710, the snoop filter is updated according to the VSA and whether the $FILL_M$ operation or the $FILL_S$ operation was performed.

When the $FILL_M$ operation was performed, a snoop filter entry corresponding to the PA is updated to have a valid address tag corresponding to the PA. Within the snoop filter entry, the set coherency information corresponding to the VSA is updated to a Shared state S when the $FILL_S$ operation was performed. The set coherency information corresponding to the VSA is updated to an Exclusive state E when the $FILL_M$ operation was performed.

The process 700 then proceeds to S712.

At S712, the process 700 determines whether a write operation is being performed. The process 700 proceeds to S714 when the write operation is being performed. The process 700 proceeds to S720 when an operation other than the write operation is being performed.

At S714, whether the coherency state of the snoop filter entry identified in S710 indicates a Modified state M or the Exclusive state E is determined. The process 700 proceeds to S716 when the coherency state is not the Modified state M or the Exclusive state E. Otherwise, the process proceeds to S718.

At S716, a Read For Ownership (RFO) operation is performed to signal to other sets of the cache (and to other caches) that the information in the cache line corresponding to the PA and the VSA is being modified.

At S718, within the snoop filter entry corresponding to the PA, set coherency information corresponding to the VSA is updated to the Modified state M.

At S720, the cached memory operation is performed using the cache line corresponds to the PA and the VSA.

In some instruction-set architectures, it is required that a load operation see the result of a store operation ahead of it in the same instruction stream, even if they are accessed with different virtual address mappings. In these cases, additional care must be taken during the period when a store access is in the processes of making the cache line unique among all the possible local cache lines within the VIPT cache where the cache line may be. If care is not taken it is possible for the later load to obtain old data from a location that is destined to be cleared so the store can complete.

One or more pending store structures may be used to provide a solution to address these access ordering issues. Pending store structures include, for example, (i) alias tables that track the potentially aliased state and block the loads from completing, by stalling them or re-executing the loads, and (ii) tracking tables that holds a pending stores until the pending store has finished gaining the locally unique state, during which time the tracking tables provide the correct data to any load that executes while the store is pending.

Many high performance processors already have such pending store structures. In an embodiment, the store may be left in the pending store structures for a few cycles longer (compared, for example, to a cache implementation where cache aliasing cannot occur) in order to allow time for cache aliasing to be detected and handled.

Further aspects of the present disclosure relate to one or more of the following clauses.

In an embodiment, a circuit comprises a Virtually Indexed Physically Tagged (VIPT) cache and a cache coherency circuit. The VIPT cache includes a plurality of sets. The VIPT cache performs a memory operation by (i) selecting, using a Virtual Set Address (VSA), a first tag of a first set of the VIPT cache, and (ii) determining whether the first tag maps a physical address to the first set by comparing a plurality of bits of the first tag to a plurality of bits of the physical address. The cache coherency circuit detects cache aliasing during the performance of the memory operation by the VIPT cache, wherein cache aliasing is detected when a second tag maps the physical address to a second set of the VIPT cache, the second set being different from the first set.

In an embodiment, the cache coherency circuit comprises first set coherency information corresponding to the first set that the physical address may be mapped into in the VIPT cache, and second set coherency information corresponding to the second set that the physical address may be mapped into in the VIPT cache.

In an embodiment, the cache coherency circuit comprises a snoop filter to cache, according to the physical address, the first set coherency information and the second set coherency information.

In an embodiment, the snoop filter comprises a plurality of snoop filter entries. Each snoop filter entry includes an address tag and a plurality of set coherency information corresponding to a plurality of set address.

In an embodiment, the cache coherency circuit manages the first set coherency information and the second set coherency information according to a cache coherency protocol.

In an embodiment, the cache coherency protocol is one of a Modified-Exclusive-Shared-Invalid (MESI) coherence protocol, a Modified-Shared-Invalid (MSI) coherence protocol, a Modified-Owned-Shared-Invalid (MOSI) coherence protocol, and a Modified-Owned-Exclusive-Shared-Invalid (MOESI).

In an embodiment, the cache coherency circuit manages cache coherency between the VIPT cache and another cache according to the cache coherency protocol.

In an embodiment, the cache coherency circuit generates a snoop set address according to set coherency information of a snoop filter entry having an address tag corresponding to the physical address. The circuit accesses the VIPT cache using the VSA when cache aliasing is not detected, and accesses the VIPT cache using the snoop set address when cache aliasing is detected.

In an embodiment, the VSA is generated according to a Virtual Address (VA), and the physical address is generated according to the VA.

In an embodiment, the VSA includes a first plurality of bits produced by an address translation of the VA, and a second plurality of bits equal to a plurality of bits of the VA that are not altered by the address translation of the VA.

In an embodiment, a method for managing a Virtually Indexed Physically Tagged (VIPT) cache comprises performing, by the VIPT cache, a memory operation and determining, using a cache coherency protocol, that cache aliasing has occurred during the memory operation. Performing the memory operation includes (i) selecting, by the VIPT cache using a Virtual Set Address (VSA), a first tag of a first set of the VIPT cache, and (ii) determining whether the first tag maps a Physical Address (PA) to the first set by comparing a plurality of bits of the first tag to a plurality of bits of the physical address. The method determines that cache aliasing has occurred during the memory operation when a second tag maps the PA to a second set, the second set being different from the first set.

In an embodiment, determining that cache aliasing has occurred includes (i) receiving the VSA, the VSA corresponding to a Virtual Address (VA), (ii) receiving the PA, the PA corresponding to the VA, (iii) selecting, using the VSA, respective cache lines from each of a plurality of ways of the VIPT cache, (iv) determining, for each selected cache line respectively, whether an address tag of the selected cache line is valid and matches the PA, and (v) determining, using a cache coherency protocol, that a first cache line corresponding to the PA is present in the VIPT cache when none of the cache lines selected using the VSA have a valid address tag that matches the PA.

In an embodiment, determining, using the cache coherency protocol, whether the first cache line corresponding to the PA is present in the VIPT cache is performed using a snoop filter, the snoop filter caching, according to the physical address, first coherency information corresponding to the first set and second coherency information corresponding to the second set.

In an embodiment, the method further comprises determining, using the snoop filter, a set address of the first cache line.

In an embodiment, the method further comprises determining a second cache line corresponding to the VSA, and copying information cached in the first cache line to the second cache line.

In an embodiment, the method further comprises setting coherency information corresponding to the VSA to a modified state when the memory operation includes a write operation.

In an embodiment, the method further comprises setting coherency information corresponding to the set address of the first cache line to an invalid state when the memory operation includes a write operation.

In an embodiment, the method further comprises maintaining, using the snoop filter, cache coherency between the VIPT cache and another cache.

In an embodiment, the cache coherency protocol includes a modified state, a shared state, and an invalid state.

In an embodiment, the cache coherency protocol further includes one or more of an exclusive state and an owned state.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A circuit comprising:
   a Virtually Indexed Physically Tagged (VIPT) cache including a plurality of sets, the VIPT cache to perform a memory operation by (i) selecting, using a Virtual Set Address (VSA), a first tag of a first set of the VIPT cache, and (ii) determining whether the first tag maps a physical address to the first set by comparing a plurality of bits of the first tag to a plurality of bits of the physical address; and
   a cache coherency circuit to detect cache aliasing during the performance of the memory operation by the VIPT cache,
   wherein cache aliasing is detected when a second tag maps the physical address to a second set of the VIPT cache, the second set being different from the first set.

2. The circuit of claim 1, wherein the cache coherency circuit comprises:
   first set coherency information corresponding to the first set that the physical address may be mapped into in the VIPT cache; and
   second set coherency information corresponding to the second set that the physical address may be mapped into in the VIPT cache.

3. The circuit of claim 2, wherein the cache coherency circuit comprises a snoop filter to cache, according to the physical address, the first set coherency information and the second set coherency information.

4. The circuit of claim 3, wherein the snoop filter comprises a plurality of snoop filter entries, each snoop filter entry including an address tag and a plurality of set coherency information corresponding to a plurality of set address.

5. The circuit of claim 2, wherein the cache coherency circuit is to manage the first set coherency information and the second set coherency information according to a cache coherency protocol.

6. The circuit of claim 5, wherein the cache coherency protocol is one of a Modified-Exclusive-Shared-Invalid (MESI) coherence protocol, a Modified-Shared-Invalid (MSI) coherence protocol, a Modified-Owned-Shared-Invalid (MOSI) coherence protocol, and a Modified-Owned-Exclusive-Shared-Invalid (MOESI).

7. The circuit of claim 5, wherein the cache coherency circuit is to manage cache coherency between the VIPT cache and another cache according to the cache coherency protocol.

8. The circuit of claim 2, wherein the cache coherency circuit is to generate a snoop set address according to set coherency information of a snoop filter entry having an address tag corresponding to the physical address;
   wherein the circuit is to access the VIPT cache using the VSA when cache aliasing is not detected; and
   wherein the circuit access is to access the VIPT cache using the snoop set address when cache aliasing is detected.

9. The circuit of claim 8, wherein the VSA is generated according to a Virtual Address (VA), and the physical address is generated according to the VA.

10. The circuit of claim 9, wherein the VSA includes a first plurality of bits produced by an address translation of the VA, and a second plurality of bits equal to a plurality of bits of the VA that are not altered by the address translation of the VA.

11. A method for managing a Virtually Indexed Physically Tagged (VIPT) cache, the method comprising:
    performing, by the VIPT cache, a memory operation, performing the memory operation including (i) selecting, by the VIPT cache using a Virtual Set Address (VSA), a first tag of a first set of the VIPT cache, and (ii) determining whether the first tag maps a Physical Address (PA) to the first set by comparing a plurality of bits of the first tag to a plurality of bits of the Physical Address;
    determining, using a cache coherency protocol, that cache aliasing has occurred during the memory operation when a second tag maps the PA to a second set, the second set being different from the first set.

12. The method of claim 11, wherein determining that cache aliasing has occurred includes:
    receiving the VSA, the VSA corresponding to a Virtual Address (VA);
    receiving the PA, the PA corresponding to the VA;
    selecting, using the VSA, respective cache lines from each of a plurality of ways of the VIPT cache;
    determining, for each selected cache line respectively, whether an address tag of the selected cache line is valid and matches the PA; and
    determining, using a cache coherency protocol, that a first cache line corresponding to the PA is present in the VIPT cache when none of the cache lines selected using the VSA have a valid address tag that matches the PA.

13. The method of claim 12, wherein determining, using the cache coherency protocol, whether the first cache line corresponding to the PA is present in the VIPT cache is performed using a snoop filter, the snoop filter caching, according to the physical address, first coherency information corresponding to the first set and second coherency information corresponding to the second set.

14. The method of claim 13, further comprising:
    determining, using the snoop filter, a set address of the first cache line.

15. The method of claim 14, further comprising:
    determining a second cache line corresponding to the VSA; and
    copying information cached in the first cache line to the second cache line.

16. The method of claim 15, further comprising setting coherency information corresponding to the VSA to a modified state when the memory operation includes a write operation.

17. The method of claim 14, further comprising setting coherency information corresponding to the set address of the first cache line to an invalid state when the memory operation includes a write operation.

18. The method of claim 13, further comprising maintaining, using the snoop filter, cache coherency between the VIPT cache and another cache.

19. The method of claim 11, wherein the cache coherency protocol includes a modified state, a shared state, and an invalid state.

20. The method of claim 19, wherein the cache coherency protocol further includes one or more of an exclusive state and an owned state.

\* \* \* \* \*